United States Patent
Jhon et al.

(10) Patent No.: US 9,793,677 B1
(45) Date of Patent: Oct. 17, 2017

(54) SINGLE PULSE LASER APPARATUS

(71) Applicant: Korea Institute of Science and Technology, Seoul (KR)

(72) Inventors: Young Min Jhon, Seoul (KR); Joon Mo Ahn, Seoul (KR); Min Ah Seo, Seoul (KR); Chul Ki Kim, Seoul (KR); Jae Hun Kim, Seoul (KR); Taik Jin Lee, Seoul (KR); Jae Bin Choi, Seoul (KR); Deok Ha Woo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/378,632

(22) Filed: Dec. 14, 2016

(30) Foreign Application Priority Data

May 9, 2016 (KR) .................. 10-2016-0056385

(51) Int. Cl.
*H01S 3/10* (2006.01)
*H01S 3/11* (2006.01)
(Continued)

(52) U.S. Cl.
CPC ........ *H01S 3/10046* (2013.01); *H01S 3/1024* (2013.01); *H01S 3/1062* (2013.01);
(Continued)

(58) Field of Classification Search
CPC .. H01S 3/1103; H01S 3/1024; H01S 3/10046; H01S 3/094076; H01S 3/1075;
(Continued)

(56) References Cited

U.S. PATENT DOCUMENTS

| 7,929,579 B2* | 4/2011 | Hohm | A61B 18/203 |
| | | | 372/12 |
| 9,106,051 B1* | 8/2015 | Goodno | H01S 3/2391 |

(Continued)

FOREIGN PATENT DOCUMENTS

| JP | 2014-103287 A | 6/2014 |
| KR | 10-1487271 B1 | 1/2015 |

OTHER PUBLICATIONS

Korean Office Action dated May 18, 2017 in corresponding Korean Patent Application No. 10-2016-0056385 (1 page in English and 6 pages in Korean).

*Primary Examiner* — Kinam Park
(74) *Attorney, Agent, or Firm* — NSIP Law (57) ABSTRACT

Disclosed herein is a single pulse laser apparatus that includes: a resonator having a first mirror, a second mirror, a gain medium, an electro-optic modulator (EOM) configured to perform single pulse switching, and an acousto-optic modulator (AOM) configured to perform mode-locking; a photodiode configured to measure a laser beam oscillated in the resonator; a synchronizer configured to convert an electrical signal, which is generated by measuring the laser beam, into a transistor-transistor logic (TTL) signal; a delay unit configured to set a delay time for the TTL signal to synchronize the EOM and the AOM and output a trigger TTL signal according to the delay time; an AOM driver configured to input the trigger TTL signal to the AOM that performs mode-locking and drive the AOM; and an EOM driver configured to input the trigger TTL signal to the EOM that performs single pulse switching and drive the EOM.

17 Claims, 9 Drawing Sheets

(51) Int. Cl.
  *H01S 3/106* (2006.01)
  *H01S 3/13* (2006.01)
  *H01S 3/117* (2006.01)
  *H01S 3/115* (2006.01)
  *H01S 3/127* (2006.01)
  *H01S 3/102* (2006.01)
  H01S 3/094 (2006.01)
  H01S 3/107 (2006.01)

(52) U.S. Cl.
  CPC .......... *H01S 3/1068* (2013.01); *H01S 3/1103* (2013.01); *H01S 3/115* (2013.01); *H01S 3/1106* (2013.01); *H01S 3/117* (2013.01); *H01S 3/127* (2013.01); *H01S 3/1305* (2013.01); *H01S 3/094076* (2013.01); *H01S 3/1075* (2013.01)

(58) Field of Classification Search
  CPC ...... H01S 3/1068; H01S 3/1106; H01S 3/115; H01S 3/117; H01S 3/127; H01S 3/1305
  See application file for complete search history.

(56) References Cited

U.S. PATENT DOCUMENTS

2010/0292931 A1* 11/2010 Wang ................. G01N 21/6408 702/19
2014/0029015 A1* 1/2014 Schmoll ............ G01B 9/02058 356/497
2016/0352068 A1* 12/2016 Jhon .................... H01S 3/1109

* cited by examiner

SINGLE PULSE LASER APPARATUS

CROSS-REFERENCE TO RELATED APPLICATIONS

This application claims priority to and the benefit of Korean Patent Application No. 10-2016-0056385, filed on May 9, 2016, the disclosure of which is incorporated herein by reference in its entirety.

BACKGROUND

1. Field of the Invention

The present invention relates to a laser apparatus, and more particularly, to a single pulse laser apparatus including an electro-optic modulator and an acousto-optic modulator for outputting a single pulse by amplifying a mode-locked laser beam.

2. Discussion of Related Art

Recently, treatment technologies using lasers are widely used, and treatment apparatuses using lasers are used for dermatology, ophthalmology, dentistry, surgical operations, and the like. Among these, laser apparatuses used in dermatology are generally used for treating a lesion such as a skin disease that develops on skin or a vessel disease, and a treatment purpose is achieved by emitting a laser beam having a certain wavelength and intensity. Various kinds of lasers are used for treatment in dermatology. An alexanderite laser (operating at 755 nm and developed in the year 2012) is mainly used for pathological skin pigmentation naturally occurring on skin and a tattoo, and uses a picosecond pulse for maximizing a treatment effect while minimizing an aftereffect. In addition, a long pulse ruby laser is used for removing hair, and an Nd:YAG laser (operating at 1060 nm), a carbon-dioxide laser ($CO_2$ laser, operating at 10.6 μm), and an argon laser (operating in a range of 488 to 514 nm) are used for treating an expandable blood vessel.

Specifically, a laser treatment apparatus is used for treating various pathological skin problems such as a pigment disorder including a stain spot and other expandable vessel diseases and a tattoo. The laser treatment apparatus may locally heat a level at which contained protein is denaturalized or pigment molecules are dispersed. Here, unlike a research or industrial laser, it is important for a medical laser to have a laser beam having a pulse width and energy suitable for treating a skin disorder. Particularly, energy has to be centralized to output pulses to maximize a treatment effect, and to this end, a laser capable of outputting a single pulse is necessary.

In conventional technology, a pulse picker method and a cavity dumping method are used for outputting a single picosecond pulse outputting high energy. However, when such methods are used, there are problems in that burdens of circuit designing and manufacturing costs and power consumption occur because a high speed and high voltage circuit is necessary and an amplifier has to be used because of low output energy, and burdens of an increased system volume due to the use of the amplifier and power consumption and cost due to a high voltage supplied to the amplifier occur.

In U.S. Pat. No. 7,929,579, a method by which a high energy single pulse is output using one electro-optic modulator (EOM) and a cavity dumping method is disclosed. However, in this case, there are problems in that burdens of cost and power consumption occur because a high voltage EOM is used and a high speed and high voltage driving circuit is necessary, and a burden of power consumption occurs due to a high voltage because all of a mode-locking, a Q-switching, and a single pulse output are performed using only one EOM. In addition, a high speed and high voltage switching circuit has to be manufactured to perform all of the mode-locking, the Q-switching, and the single pulse output using the high voltage EOM. In addition, even though a use of an amplifier is not necessary because a high energy picosecond single pulse can be output, there is a limitation in generating a short pulse width because complete mode-locking is not implemented.

PRIOR ART

Patent Document 1: U.S. Pat. No. 7,929,579

SUMMARY OF THE INVENTION

The present invention is directed to providing a single pulse laser apparatus for outputting a single pulse by amplifying a mode-locked laser beam.

The present invention is also directed to providing a single pulse laser apparatus capable of concentrating energy on an output single pulse laser beam using a cavity dumping technology, and reflecting a picosecond pulse width of a mode-locked laser beam on an output beam using a prelasing method.

The present invention is also directed to providing a single pulse laser apparatus including a synchronizing circuit for synchronizing an electro-optic modulator (EOM) and an acousto-optic modulator (AOM).

According to an aspect of the present invention, there is provided a single pulse laser apparatus that includes: a resonator having a first mirror, a second mirror, a gain medium, an electro-optic modulator (EOM) configured to perform single pulse switching, and an acousto-optic modulator (AOM) configured to perform mode-locking; a photodiode configured to measure a laser beam oscillated in the resonator; a synchronizer configured to convert an electrical signal, which is generated by measuring the laser beam, into a transistor-transistor logic (TTL) signal; a delay unit configured to set a delay time for the TTL signal to synchronize the EOM and the AOM and output a trigger TTL signal according to the delay time; an AOM driver configured to input the trigger TTL signal to the AOM that performs mode-locking and drive the AOM; and an EOM driver configured to input the trigger TTL signal to the EOM that performs single pulse switching and drive the EOM, wherein: when the AOM performs Q-switching, the AOM performs mode-locking and performs the Q-switching by outputting energy stored due to cavity loss; and when the EOM performs Q-switching, the AOM prelases a laser beam having a specific picosecond pulse width, performs the Q-switching by outputting energy stored due to the cavity loss generated through a wavelength plate, and performs single pulse switching.

The single pulse laser apparatus may further include a controller configured to monitor a pulse width and pulse energy of a laser beam output from the resonator and determine the delay time.

When the EOM performs the Q-switching, the controller may determine the delay time based on an interval between pulses prelased and mode-locked and amplitude of a mode-locked pulse amplified in an intra-cavity of the resonator.

The controller may determine a duration time during which the trigger TTL signal is maintained.

The single pulse laser apparatus may further include a power supplier configured to supply energy to the gain medium and input a synchronizing TTL signal, which is output when a lamp is pumped, to the delay unit The single pulse laser apparatus may further include an etalon configured to adjust a pulse width of the laser beam.

The etalon may be an optical device corresponding to a flat plate having parallel surfaces which have a constant reflectivity, wherein the constant reflectivity is increased by depositing a dielectric multi-layer thin film on one or both surfaces of the flat plate having the parallel surfaces made of glass or crystal, and the pulse width of the laser beam may be adjusted by a reflectivity, a thickness, and a refractive index of the etalon by limiting a transmission wavelength band of the laser beam when the laser beam is transmitted through the etalon.

The pulse width of the laser beam may be adjusted by selectively using one or more etalons having different properties in an intra-cavity or extra-cavity of the resonator.

The pulse width of the laser beam may be adjusted within a range of 100 ps to 1 ns.

According to another aspect of the present invention, there is provided a single pulse laser apparatus that includes: a resonator having a first mirror, a second mirror, a gain medium, a first EOM configured to perform Q-switching, a second EOM configured to perform single pulse switching, and an AOM configured to perform mode-locking; a photodiode configured to measure a laser beam oscillated in the resonator; a synchronizer configured to convert an electrical signal, which is generated by measuring the laser beam, into a transistor-transistor logic (TTL) signal; a delay unit configured to set a delay time for the TTL signal to synchronize the EOM and the AOM and output a trigger TTL signal according to the delay time; an AOM driver configured to input the trigger TTL signal to the AOM that performs mode-locking and drive the AOM; a first EOM driver configured to input the trigger TTL signal to the first EOM that performs Q-switching and drive the first EOM; and a second EOM driver configured to input the trigger TTL signal to the second EOM that performs single pulse switching and drive the second EOM, wherein: the AOM consecutively performs mode-locking; the first EOM preforms Q-switching by outputting energy stored due to cavity loss generated through a wavelength plate; and the second EOM preforms single pulse switching.

The single pulse laser apparatus may further includes a controller configured to monitor a pulse width and pulse energy of a laser beam output from the resonator and determine the delay time.

The controller may determine a duration time during which the trigger TTL signal is maintained.

The single pulse laser apparatus may further include a power supplier configured to supply energy to the gain medium and input a synchronizing TTL signal, which is output when a lamp is pumped, to the delay unit.

The single pulse laser apparatus may further include an etalon configured to adjust a pulse width of the laser beam.

The etalon may be an optical device corresponding to a flat plate having parallel surfaces which have a constant reflectivity, wherein the constant reflectivity is increased by depositing a dielectric multi-layer thin film on one or both surfaces of the flat plate having the parallel surfaces made of glass or crystal, and the pulse width of the laser beam may be adjusted by a reflectivity, a thickness, and a refractive index of the etalon by limiting a transmission wavelength band of the laser beam when the laser beam is transmitted through the etalon.

The pulse width of the laser beam may be adjusted by selectively using one or more etalons having different properties in an intra-cavity or extra-cavity of the resonator.

The pulse width of the laser beam may be adjusted within a range of 100 ps to 1 ns.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to accompanying drawings. However, the embodiments are provided to be fully understood by those skilled in the art and may be changed to various forms, and the scope of the present invention is not limited by the embodiments described below.

In addition, major factors of a laser for treating skin are pulse energy, a pulse width, a picosecond, a laser wavelength, Q-switching, mode-locking, a single pulse, cavity dumping, and the like.

Figure 1:
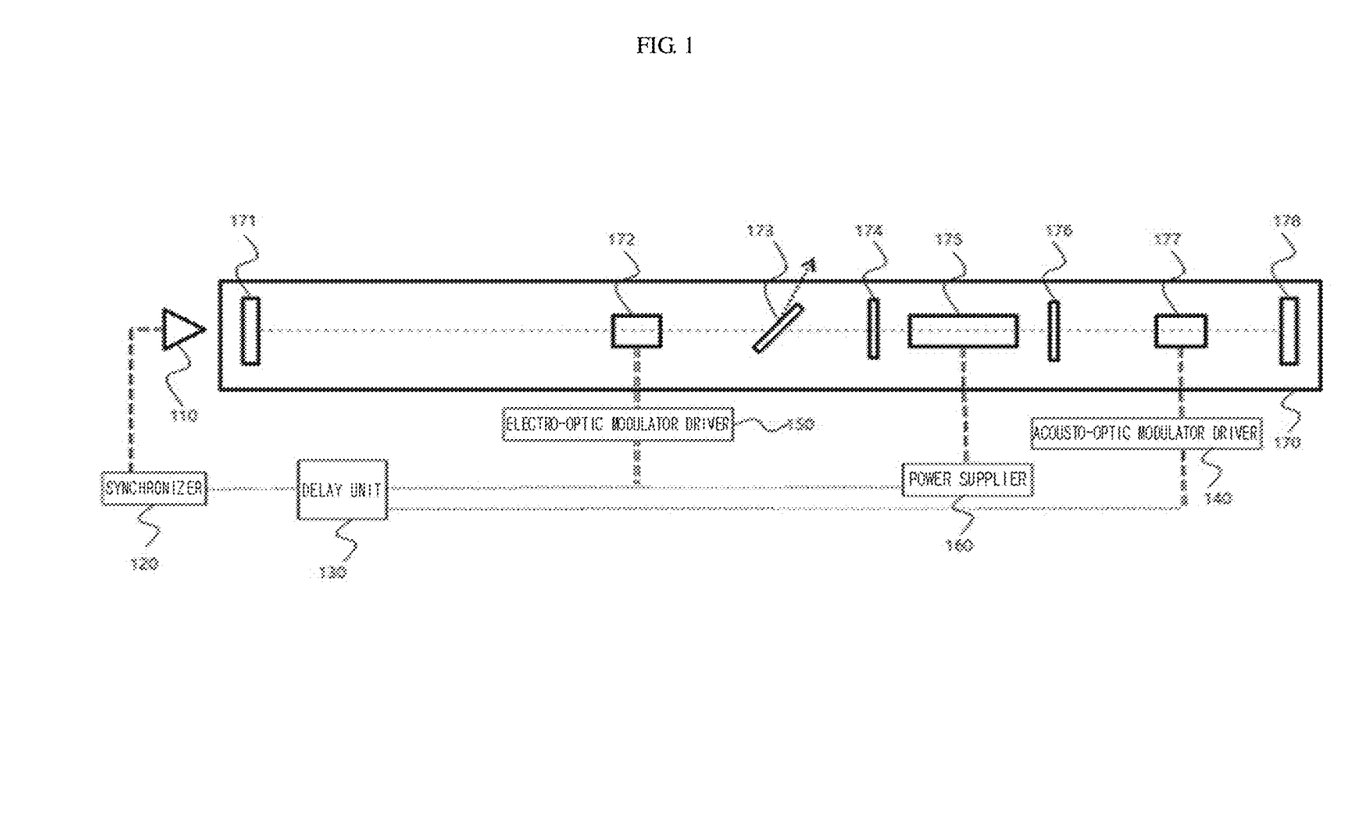
FIG. 1 is a block diagram of a single pulse laser apparatus according to a first embodiment of the present invention.

FIG. 1 is a block diagram of a single pulse laser apparatus according to a first embodiment of the present invention.

Referring to FIG. 1, the single pulse laser apparatus according to the first embodiment of the present invention includes a photodiode 110, a synchronizer 120, a delay unit 130, an acousto-optic modulator (AOM) driver 140, an electro-optic modulator (EOM) driver 150, a power supplier 160, and a resonator 170, and the resonator 170 includes a first mirror 171, an EOM 172 that perform single pulse switching, a linear polarizer 173, an iris 174, a gain medium 175, an etalon 176, an AOM 177 that performs mode-locking, and a second mirror 178.

In the single pulse laser apparatus according to the first embodiment of the present invention, the Q-switching is preferably performed by the AOM 177. Here, the AOM has advantages in power consumption and cost because the AOM does not require designing and manufacturing a specific high speed and high voltage circuit and uses radio frequency (RF) of a low voltage rather than a high voltage.

Hereinafter, the first mirror 171 included in the resonator 170, a wavelength plate 179, the EOM 172 that performs single pulse switching, the linear polarizer 173, the iris 174, the gain medium 175, the etalon 176, the AOM 177 performs mode-locking and Q-switching, and the second mirror 178 will be described.

The first mirror 171 and the second mirror 178 are disposed at both ends of the resonator 170. The first mirror 171 and the second mirror 178 are total reflectors having a reflectivity of 99.9% or more for implementing a cavity dumping method.

The linear polarizer 173 outputs a laser beam that is oscillated by the resonator 170.

The gain medium 175 is a material capable of inversing population by pumping, and light incident on the material from the outside is amplified and output as high intensity light. A flash lamp, an arc lamp, other lasers, or the like may be used as an external pumping device. An alexandrite or titanium doped sapphire crystal rod or a neodymium doped yttrium aluminum garnet (Nd:YAG) crystal rod may be used as the gain medium 175.

For example, when light is incident on the gain medium 175 using a pump lamp, light excited in the gain medium 175 passes through the etalon 176 along an optical axis and is reflected by the second mirror 178. Then, the light that sequentially passed through the etalon 176, the gain medium 175, and the EOM 172 along the optic axis is reflected by the first mirror 171.

The etalon 176 serves to adjust a pulse width of a laser beam, and is an optical device that is a flat plate having parallel surfaces which have a constant reflectivity, wherein the constant reflectivity is increased by depositing a dielectric multi-layer thin film on one or both surfaces of the flat plate having the parallel surfaces made of glass or crystal. The etalon 176 will be described in detail below with respect to FIG. 9.

The AOM 177 that performs mode-locking and Q-switching performs the Q-switching by oscillating and causing energy sufficiently stored due to cavity loss to be output at a moment after maximizing the cavity loss by generating a mode-locking state and preventing oscillation.

The EOM 172 that performs single pulse switching causes a single pulse to be output by perpendicularly returning a polarized beam by switching a pulse Q-switched through the AOM 177 and reflecting the polarized beam using the linear polarizer 173.

Hereinafter, the photodiode 110, the synchronizer 120, the delay unit 130, the AOM driver 140, the EOM driver 150, and the power supplier 160 for generating a single pulse laser beam based on a laser beam oscillated by a resonator according to the first embodiment of the present invention will be described.

The photodiode 110 measures a laser beam oscillated by the resonator, generates an electrical signal based on the measurement of the laser beam, and inputs the electrical signal to the synchronizer 120.

The synchronizer 120 converts the electrical signal received from the photodiode 110 to a transistor-transistor logic (TTL) signal. Then, the synchronizer 120 inputs the TTL signal to the delay unit 130.

The delay unit 130 sets a delay time for the TTL signal received from the synchronizer 120 and outputs a trigger TTL signal to the AOM driver 140. Here, the delay time is determined by a controller for synchronizing a mode-locked pulse train to be Q-switched.

The AOM driver 140 receives the trigger TTL signal delayed for a specific delay time from the delay unit 130, inputs the trigger TTL signal to the AOM 177 that performs mode-locking and Q-switching, and drives the AOM 177 to perform mode-locking and the Q-switching.

The EOM driver 150 receives the trigger TTL signal delayed for the specific delay time from the delay unit 130, supplies a voltage V to the EOM 172 that performs single pulse switching, and drives the EOM 172 to switch a Q-switched pulse to a single pulse.

In addition, although not described in the drawings, the controller determines the delay time by monitoring a pulse width and pulse energy of a laser beam output from the resonator 170. For example, the controller may determine the delay time based on a time in which a pulse width of a laser beam is less than a predetermined reference and pulse energy is generated to be greater than the predetermined reference. In addition, the controller may supply the determined delay time to the delay unit 130, and the delay unit 130 may set a corresponding delay time for the trigger TTL signal, delay the trigger TTL signal for the corresponding delay time, and supply the trigger TTL signal to the AOM driver 140 and the EOM driver 150. In addition, the controller may determine a duration time during which the trigger TTL signal is maintained.

The power supplier 160 supplies energy to the gain medium 175, and inputs a synchronizing TTL signal output when a lamp is pumped in the delay unit 130. In addition, the lamp is pumped using power supplied by the power supplier 160, pumped light is incident on the gain medium 175, and thus energy necessary for generating a laser beam may be supplied.

Figure 2:
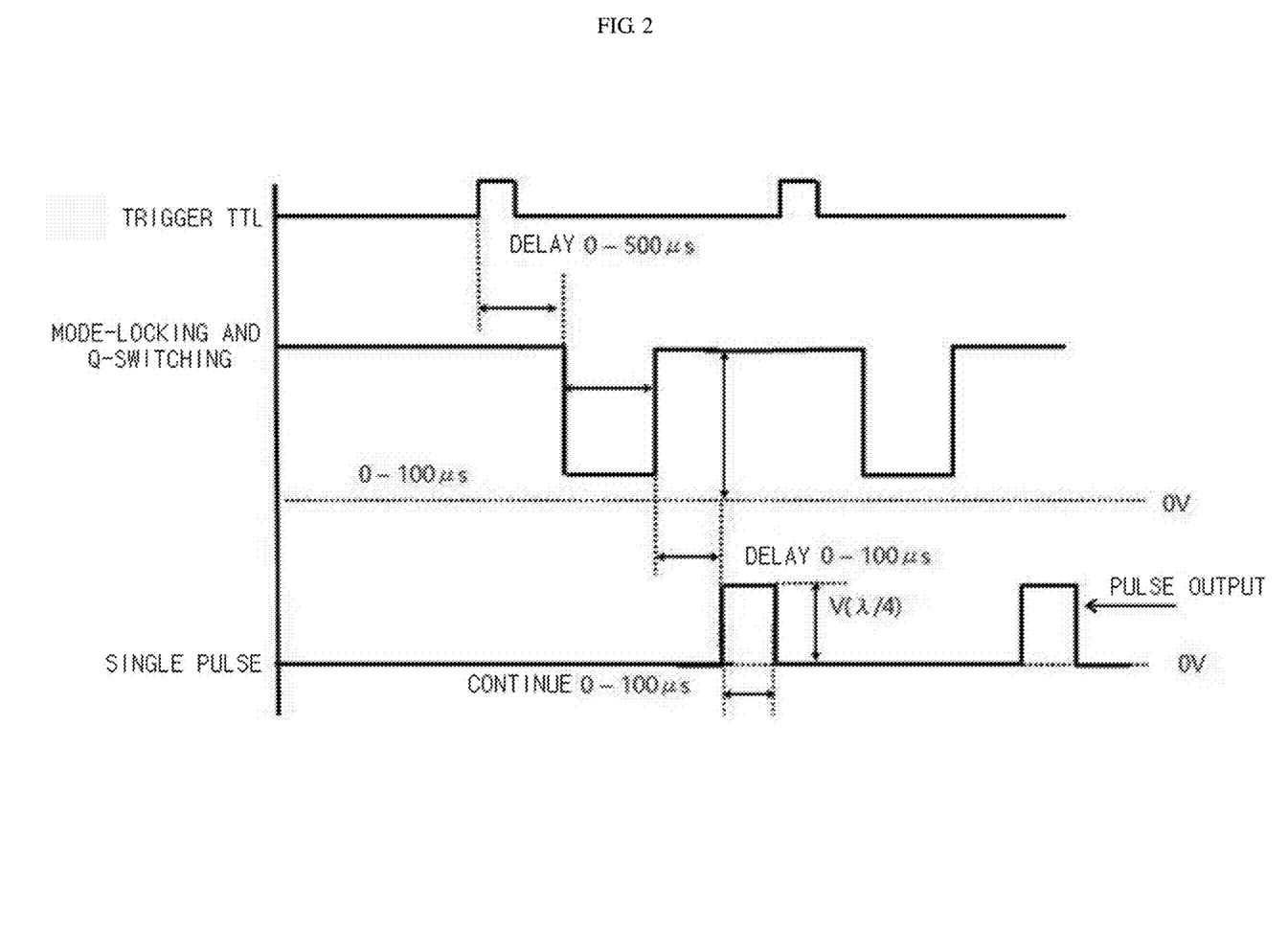
FIG. 2 is a graph for showing a process in which mode-locking and Q-switching are performed according to a trigger transistor-transistor logic (TTL) signal in the single pulse laser apparatus according to the first embodiment.

In a signal flow for synchronizing and a process in which a single pulse is output by performing the mode-locking and the Q-switching illustrated in FIGS. 1 and 2, the photodiode 110 measures a laser beam oscillated by the resonator 170 and inputs an electrical signal in the synchronizer 120. The synchronizer 120 converts the electrical signal into a TTL signal and inputs the TTL signal in the delay unit 130.

After delaying the TTL signal for a set delay time, the delay unit 130 generates a trigger TTL signal, inputs the trigger TTL signal to the AOM driver 140, and causes the AOM 177 to operate. In one embodiment, the delay unit 131 may receive a synchronizing TTL signal output from the power supplier 150 when the power supplier 150 pumps the lamp, and may also input the trigger TTL signal to the AOM driver 140.

Here, the AOM 177 receives radio frequency (RF) power such that it does not oscillate from the beginning. When the trigger TTL signal delayed for the set delay time is input to the AOM 177, a Q-switched and mode-locked pulse is generated, that is, the AOM 177 performs mode-locking and performs Q-switching by causing energy stored due to cavity loss to be output.

When the trigger TTL signal delayed by the delay unit 130 is finally input to the EOM driver 150, the EOM driver 150 drives the EOM 172 that performs single pulse switching by receiving the trigger TTL signal to operate, and the EOM 172 outputs the Q-switched and mode-locked pulse as a single pulse.

The delay time is preferably determined through the controller, and the controller may determine the delay time based on a specific time at which a pulse width is less than a specific reference and pulse energy is greater than the specific reference while monitoring the pulse width and the pulse energy of an output laser beam through an oscilloscope. In one embodiment, a function of the controller may be performed based on data input from the outside by a user or may be automatically performed in the controller. That is, the controller directly performs monitoring, determines the delay time, and provide the delay time to the delay unit 130, or the delay time input by the user may be provided to the delay unit 130. In addition, the controller may also set a duration time during which the trigger TTL signal is maintained and may provide the duration time to the delay unit 130.

Figure 3:
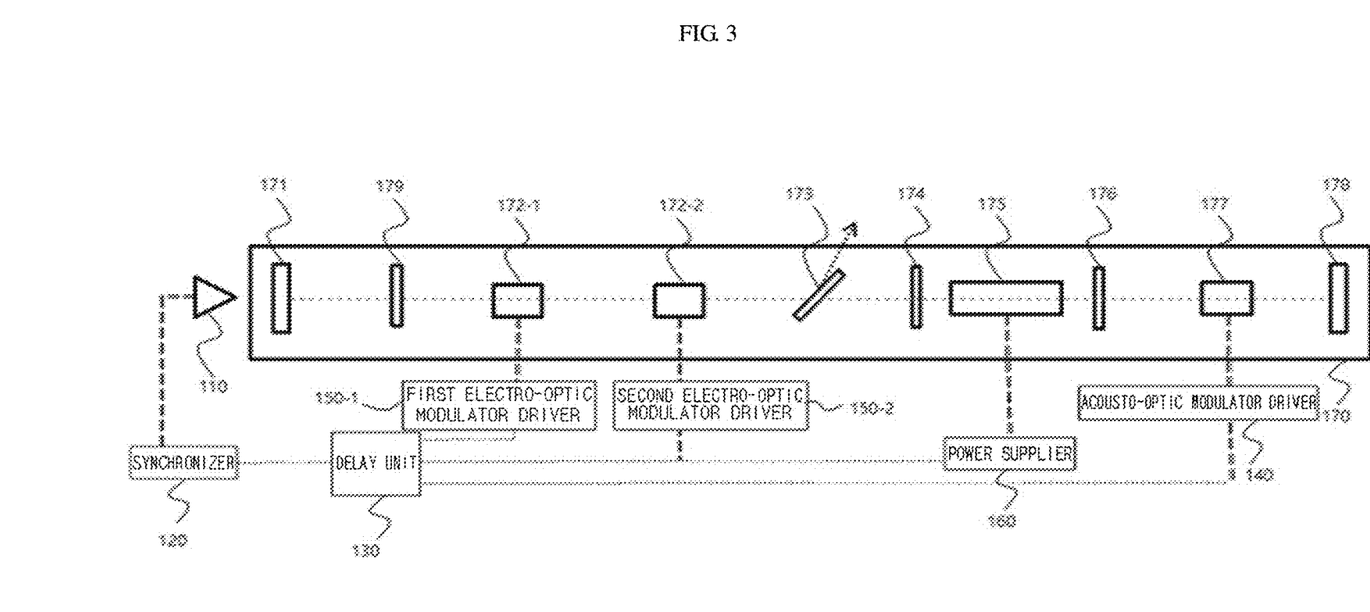
FIG. 3 is a block diagram of a single pulse laser apparatus according to a second embodiment of the present invention.

FIG. 3 is a block diagram of a single pulse laser apparatus according to a second embodiment of the present invention.

Referring to FIG. 3, the single pulse laser apparatus according to the second embodiment of the present invention includes a photodiode 110, a synchronizer 120, a delay unit 130, an AOM driver 140, a first EOM driver 150-1, a second EOM driver 150-2, a power supplier 160, and a resonator 170, and the resonator 170 includes a first mirror 171, a first EOM 172-1 that perform Q-switching, a second EOM 172-2 that performs single pulse switching, a linear polarizer 173, an iris 174, a gain medium 175, an etalon 176, an AOM 177 that performs mode-locking, a second mirror 178, and a wavelength plate 179. Description of components that are the same as the components described in the single pulse laser apparatus according to the first embodiment of the present invention with reference to FIGS. 1 and 2 will not be repeated.

In the single pulse laser apparatus according to the second embodiment of the present invention, the resonator 170 includes the first and second EOMs 172-1 and 172-2 which are one AOM 177 and two EOMs, and the first EOM 172-1 performs Q-switching, the second EOM 172-2 performs single pulse switching, and the AOM 177 only performs mode-locking.

First, in the single pulse laser apparatus according to the second embodiment of the present invention, the first and second EOM drivers 150-1 and 150-2 are included in the resonator 170, the first EOM driver 150-1 receives a trigger TTL signal delayed for a specific delay time from the delay unit 130, provides a voltage to the first EOM 172-1 that performs Q-switching, and drives the first EOM 172-1 to perform the Q-switching, and the second EOM driver 150-2 receives the trigger TTL signal delayed for the specific delay time from the delay unit 130, provides a voltage to the second EOM 172-2 that performs single pulse switching, and drives the second EOM 172-2 to perpendicularly return a polarized beam, the linear polarizer 173 to reflect a pulse, and a single pulse to be output.

Figure 4:
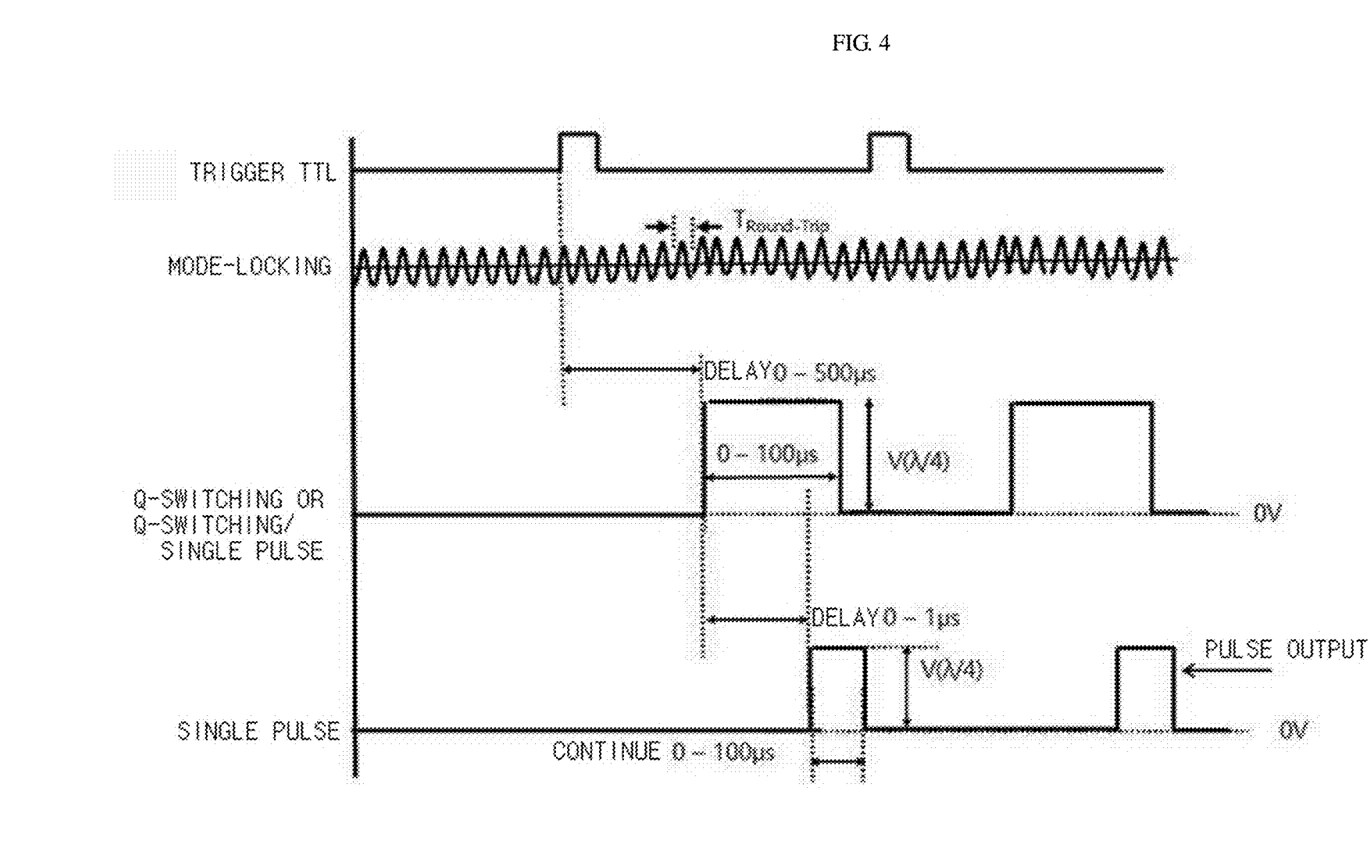
FIG. 4 is a graph for showing a process in which mode-locking and Q-switching are performed according to a TTL signal in the single pulse laser apparatus according to the second embodiment.

Hereinafter, a signal flow and a process in which a single pulse is output by performing the mode-locking and the Q-switching that are performed in the single pulse laser apparatus according to the second embodiment of the present invention will be described with reference to FIGS. 3 and 4.

The AOM 177 consecutively performs mode-locking.

The photodiode 110 measures a laser beam oscillated in the resonator 170 and inputs an electrical signal to the synchronizer 120. The synchronizer 120 converts the electrical signal into a TTL signal and inputs the TTL signal to the delay unit 130.

Then, the delay unit 130 generates a trigger TTL signal after delaying the TTL signal for a set delay time, inputs the trigger TTL signal to the first EOM driver 150-1, and causes the first EOM 172-1 to operate. Here, the first EOM 172-1 performs Q-switching by returning a polarized beam according to the signal input by the first EOM driver 150-1 and outputting energy sufficiently stored due to cavity loss maximized by the wavelength plate 179 and the linear polarizer 173 at a moment preventing oscillation.

When a pulse output with sufficient energy of the resonator 170 obtained by sufficiently moving light forward and backward in the resonator 170 is monitored by an oscilloscope, the delay unit 130 inputs the trigger TTL signal delayed for the set delay time in the second EOM driver 150-2, and causes the second EOM 172-2 to operate. Here, the second EOM 172-2 finally causes a single pulse to be output by perpendicularly returning the polarized beam according to the signal input by the second EOM driver 150-2 and reflecting the pulse using the linear polarizer 173.

A process in which a delay time and a duration time are determined is preferably performed similarly to the process described in the first embodiment.

Figure 5:
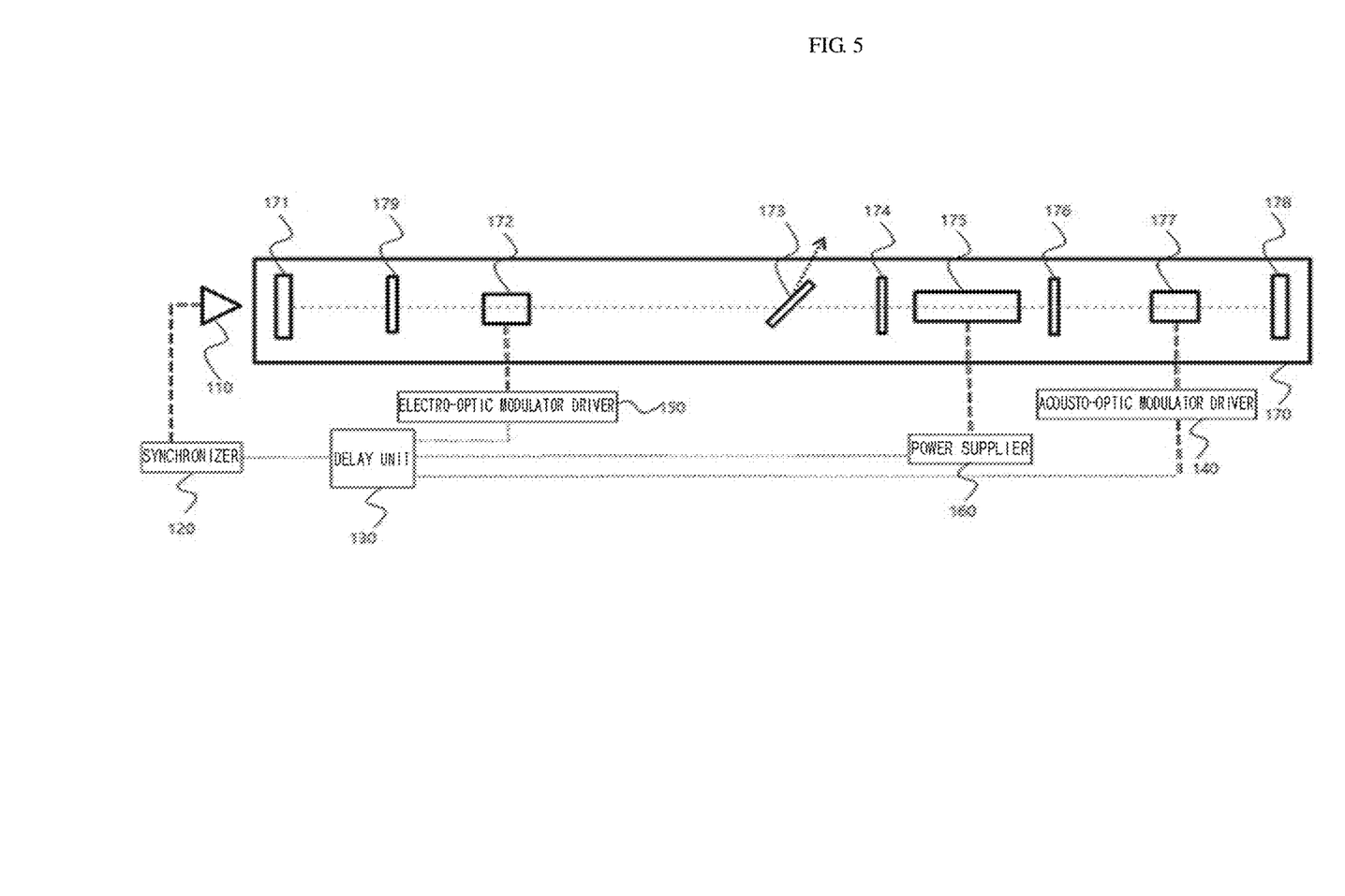
FIG. 5 is a block diagram of a single pulse laser apparatus according to a third embodiment of the present invention.

FIG. 5 is a block diagram of a single pulse laser apparatus according to a third embodiment of the present invention.

Referring to FIG. 5, the single pulse laser apparatus according to the third embodiment of the present invention includes a photodiode 110, a synchronizer 120, a delay unit 130, an AOM driver 140, an EOM driver 150, a power supplier 160, and a resonator 170, and the resonator 170 includes a first mirror 171, an EOM 172 that performs single pulse switching, a linear polarizer 173, an iris 174, a gain medium 175, an etalon 176, an AOM 177 that performs mode-locking, a second mirror 178, and a wavelength plate 179. Description of components that are the same as the components described in the single pulse laser apparatus according to the first and second embodiments of the present invention with reference to FIGS. 1 to 4 will not be repeated.

In the single pulse laser apparatus according to the third embodiment, Q-switching is preferably performed in the EOM 172. That is, unlike the single pulse laser apparatus according to the first embodiment, the EOM 172 performs Q-switching and single pulse switching, and the AOM 177 only performs mode-locking.

Figure 6:
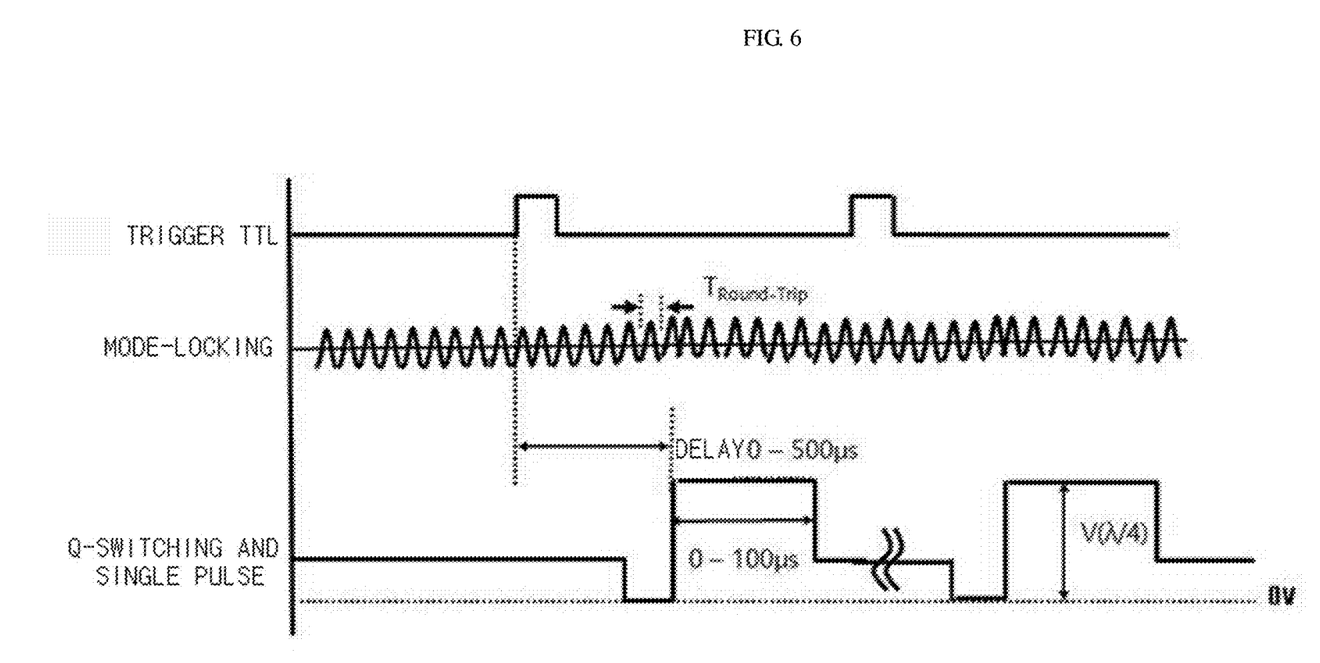
FIG. 6 is a graph for showing a process in which mode-locking and Q-switching are performed according to a TTL signal in the single pulse laser apparatus according to the third embodiment.

Hereinafter, a signal flow and a process in which a single pulse is output by performing the mode-locking and the Q-switching that are performed in the single pulse laser apparatus according to the third embodiment of the present invention will be described with reference to FIGS. 5 and 6.

The AOM 177 consecutively performs mode-locking, a direct current (DC) is always applied to the EOM 172, and thus a mode-locked pulse is prelased. That is, the AOM 177 that performs mode-locking operates at a constant amplitude and a constant frequency from the beginning. That is, a prelasing state may be acquired by generating a mode-locked pulse with a very low intensity in the resonator 170 using the AOM 177, or may be acquired by adjusting a DC voltage of the EOM.

In addition, the etalon 176 adjusts the prelased pulse to have a pulse width in a range of 100 ps to 1 ns, and because the first and second mirrors 171 and 178 are total reflectors having a reflectivity of 99.9% or more, a beam may not escape outside of the resonator 170, and all pumping energy is stored in the resonator 170.

Cavity loss occurs through the wavelength plate 179 and the linear polarizer 174, and the cavity loss is maximized by setting the voltage of the EOM 172 to zero. When sufficient energy is stored in a state in which the cavity loss is maximum and a trigger TTL signal generated in the delay unit and delayed for a specific delay time is input to the EOM 172, a mode-locked and Q-switched single pulse is output by outputting sufficiently stored energy by raising the voltage of the EOM 172 to a quarter wave voltage at a moment.

A process in which a delay time and a duration time are determined is preferably performed similarly to the process described in the first embodiment.

Figure 7:
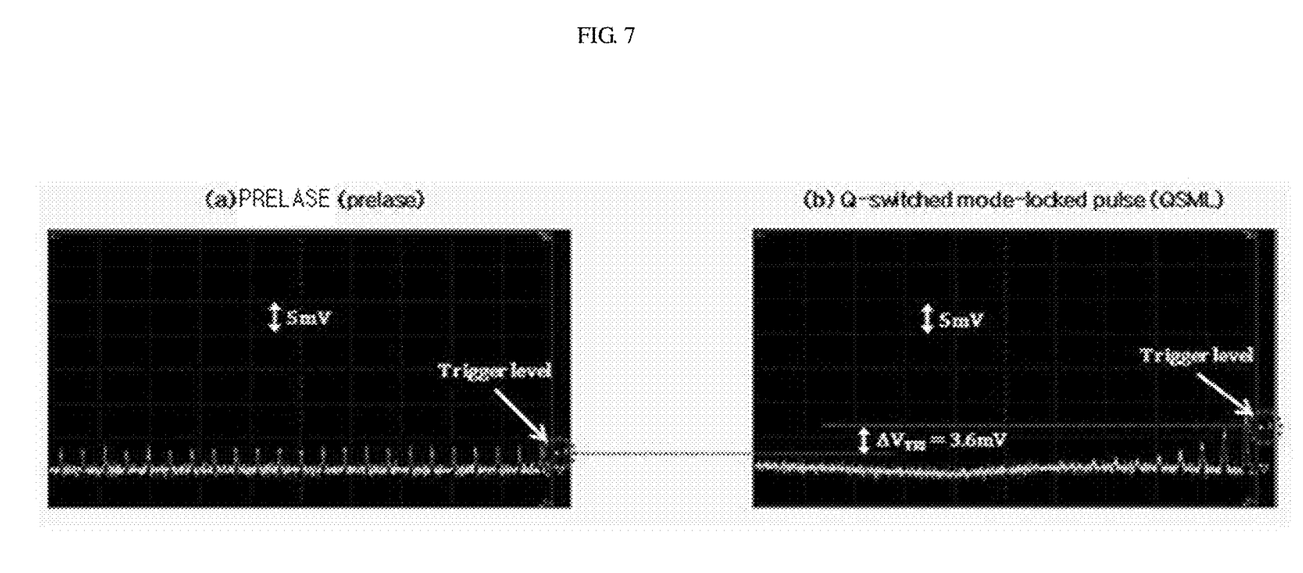
FIG. 7 is a graph for showing a prelasing state and a Q-switched and mode-locked laser beam in the single pulse laser apparatus according to the third embodiment.

FIG. 7 is a graph for showing a prelasing state and a Q-switched and mode-locked laser beam.

FIG. 7A is a graph of the prelasing state measured while lowering a trigger level, and FIG. 7B is a graph of a beginning portion of a Q-switched and mode-locked pulse measured while raising the trigger level.

That is, referring to FIG. 7, a single pulse laser beam with high energy is generated when Q-switching and mode-locking are performed after prelasing.

Figure 8:
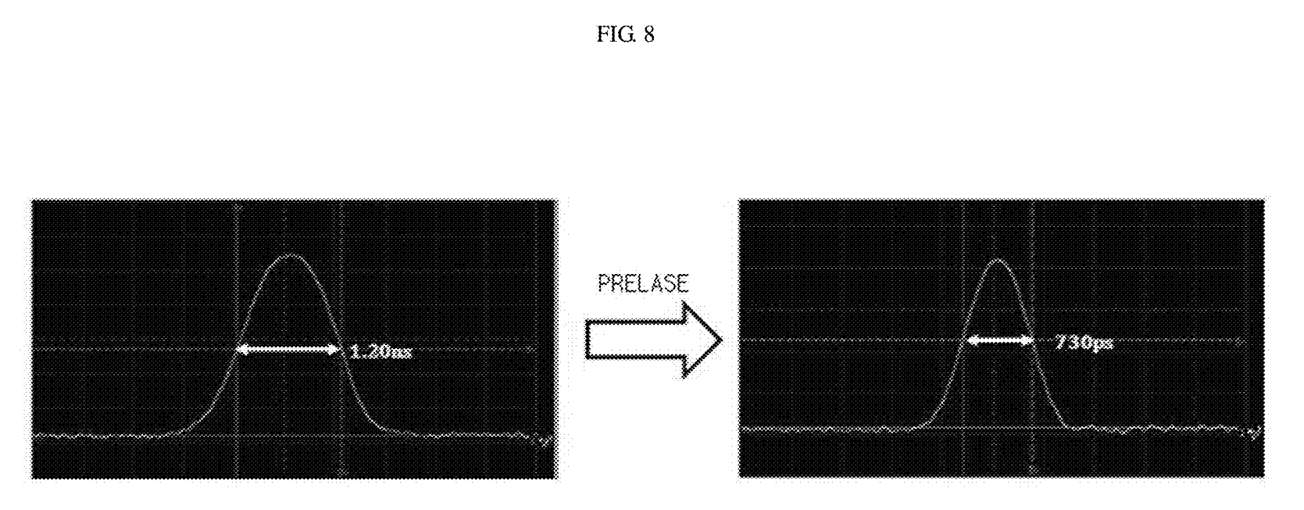
FIG. 8 is a graph for showing a pulse width changed according to prelasing in the single pulse laser apparatus according to the third embodiment.

FIG. 8 is a graph of a pulse width changed according to prelasing.

Referring to FIG. 8, when a pulse width of a pulse on which Q-switching and mode-locking are performed without prelasing is compared with that of a pulse on which Q-switched and mode-locked pulse are performed using prelasing, the pulse width is formed to be smaller in the case using prelasing.

That is, the pulse width is formed to be smaller by reflecting a picosecond pulse width of a prelased continuous wave (CW) mode-locked pulse to an output beam using a prelasing method by which CW lasing is performed before Q-switching is performed.

Through this process, a single pulse laser beam having a narrow pulse width and high energy may be formed and thus there is an advantage in which the laser beam may be concentrated on a local position.

Figure 9:
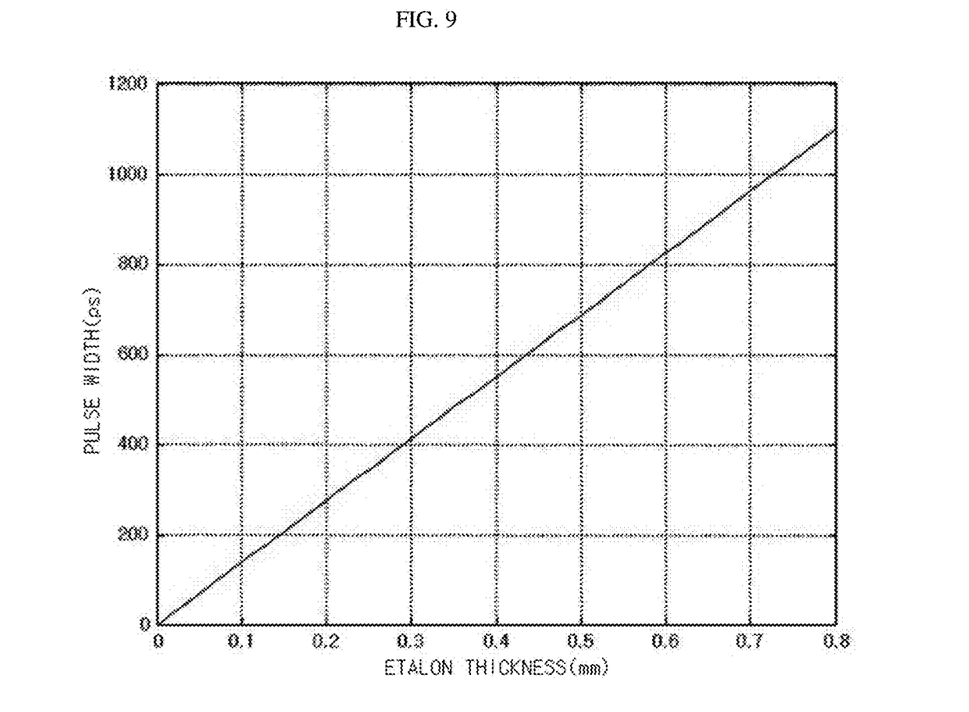
FIG. 9 is a graph for showing a pulse width changed according to a thickness of an etalon.

FIG. 9 is a graph for showing a pulse width changed according to a thickness of an etalon.

A pulse width of a Q-switched and mode-locked pulse output after prelasing is performed may be adjusted up to a pulse width of 1 ns or more using the etalon 176, and the etalon 176 may have various thicknesses to adjust the pulse width.

More specifically, when a laser beam is transmitted through the etalon 176, a transmission wavelength band of the laser beam is limited by reflectivity, thickness, and refractive index of the etalon 176, and the pulse width is adjusted accordingly.

Here, the degree of freedom of the pulse width of a laser beam may be raised by adjusting the number of the etalons 176. For example, the pulse width may be preferably and freely adjusted in a range of 100 ps to 1 ns for a medical laser.

When the etalon 176 is disposed at an extra-cavity of the resonator 170, an effect of generating a required pulse width may be obtained when the reflectivity is very high because a laser passes the etalon 176 only once while being output. Conversely, when the etalon 176 is disposed in an intra-cavity of the resonator 170, an effect similar to an effect of a high reflective etalon installed at the extra-cavity of the resonator 170 may be obtained even when a simple parallel plate type etalon 176 having no dielectric thin films on either surface thereof and having a low reflectivity of about 4% is used because a laser sufficiently moves forward and backward in the intra-cavity of the resonator 170.

Through this, there is an advantage in which a suitable pulse width may be selected for a treatment.

Figure 10:
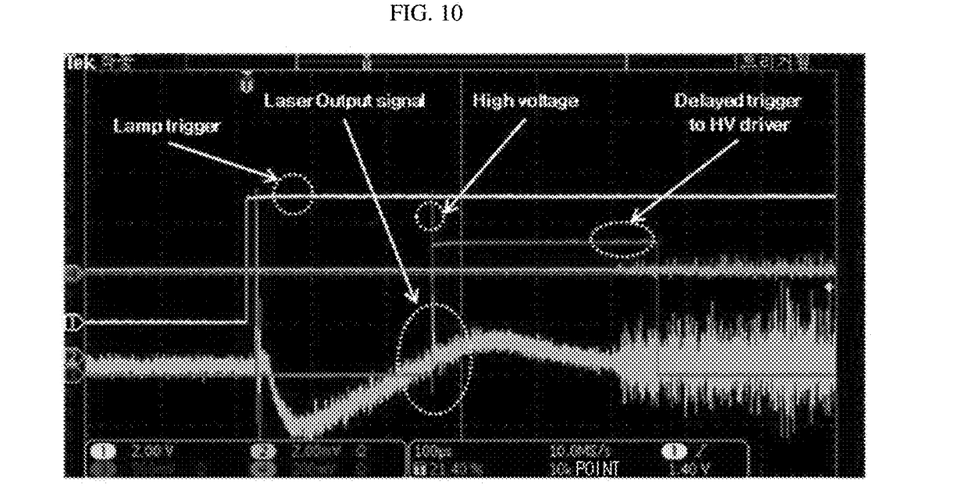
FIG. 10 is an example of a trigger TTL signal and a pulse output that are output through a single pulse laser apparatus according to the present invention.

In addition, a trigger TTL signal and a pulse output that are output through any one of the single pulse laser apparatuses according to the first to third embodiments of the present invention with reference to FIGS. 1 to 6 are shown in FIG. 10.

As described above, in a single pulse laser apparatus according to the present invention, because a single pulse is output by amplifying a mode-locked laser beam using an EOM, an AOM, and a synchronizing circuit for synchronizing the EOM and AOM, there is an advantage in which a pulse picker is not used.

In a single pulse laser apparatus according to the present invention, there are advantages in which energy can be concentrate on a single pulse output beam through a dumping technology, and a picosecond pulse width of a CW mode-locked laser beam can be reflected on an output beam through a prelasing method.

In a single pulse laser apparatus according to the present invention, because energy can be sufficiently obtained in a laser resonator, there is an advantage in which an amplifier is not used.

In a single pulse laser apparatus according to the present invention, costs can be reduced because designing and manufacturing of a specific high speed and high voltage circuit is not necessary for a single pulse output, and there is an advantage in which the apparatus can be applied to an industry in which high peak power are necessary in addition to the medical field because a single pulse having a picosecond pulse width can be output.

In a single pulse laser apparatus according to the present invention, there are advantages in which a suitable pulse width and energy of an output beam can be set using an etalon according to a treatment purpose and also the application of apparatus can be expanded to other solid lasers in addition to Alexandrite lasers.

In addition, in a single pulse laser apparatus according to the present invention, there is an advantage in which power consumption and costs can be reduced by using a low voltage AOM.

Although the single pulse laser apparatus has been described above according to the exemplary embodiments of the present invention, the present invention is not limited thereto and may be variously changed within a range of the claims, the description, and the accompanying drawings, and such changes fall within the scope of the present invention.

REFERENCE NUMERALS

100: SINGLE PULSE LASER APPARATUS
110: PHOTODIODE
120: SYNCHRONIZER
130: DELAY UNIT
140: ACOUSTO-OPTIC MODULATOR DRIVER
150: ELECTRO-OPTIC MODULATOR DRIVER
160: POWER SUPPLIER
170: RESONATOR
171: FIRST MIRROR
172: ELECTRO-OPTIC MODULATOR
173: LINEAR POLARIZER
174: IRIS
175: GAIN MEDIUM
176: ETALON
177: ACOUSTO-OPTIC MODULATOR
178: SECOND MIRROR
179: WAVELENGTH PLATE

What is claimed is:

1. A single pulse laser apparatus including a resonator having a first mirror, a second mirror, a gain medium, an electro-optic modulator (EOM) configured to perform single pulse switching, and an acousto-optic modulator (AOM) configured to perform mode-locking, the single pulse laser apparatus comprising:
   a photodiode configured to measure a laser beam oscillated in the resonator;
   a synchronizer configured to convert an electrical signal, which is generated by measuring the laser beam, into a transistor-transistor logic (TTL) signal;
   a delay unit configured to set a delay time for the TTL signal to synchronize the EOM and the AOM and output a trigger TTL signal according to the delay time;
   an AOM driver configured to input the trigger TTL signal to the AOM that performs mode-locking and drive the AOM; and
   an EOM driver configured to input the trigger TTL signal to the EOM that performs single pulse switching and drive the EOM,
   wherein:
   when the AOM performs Q-switching, the AOM performs mode-locking and performs the Q-switching by outputting energy stored due to cavity loss; and
   when the EOM performs Q-switching, the AOM prelases a laser beam having a specific picosecond pulse width, performs the Q-switching by outputting energy stored due to cavity loss generated through a wavelength plate, and performs single pulse switching.

2. The single pulse laser apparatus of claim 1, further comprising a controller configured to monitor a pulse width and pulse energy of the laser beam output from the resonator and determine the delay time.

3. The single pulse laser apparatus of claim 2, wherein, when the EOM performs the Q-switching, the controller determines the delay time based on an interval between pulses prelased and mode-locked and amplitude of a mode-locked pulse amplified in the resonator.

4. The single pulse laser apparatus of claim 2, wherein the controller determines a duration time during which the trigger TTL signal is maintained.

5. The single pulse laser apparatus of claim 1, further comprising a power supplier configured to supply energy to the gain medium and input a synchronizing TTL signal, which is output when a lamp is pumped, to the delay unit.

6. The single pulse laser apparatus of claim 1, further comprising an etalon configured to adjust a pulse width of the laser beam.

7. The single pulse laser apparatus of claim 6, wherein:
   the etalon is an optical device corresponding to a flat plate having parallel surfaces which have a constant reflectivity, wherein the constant reflectivity is increased by depositing a dielectric multi-layer thin film on one or both surfaces of the flat plate having the parallel surfaces made of glass or crystal; and
   the pulse width of the laser beam is adjusted by a reflectivity, a thickness, and a refractive index of the etalon by limiting a transmission wavelength band of the laser beam when the laser beam is transmitted through the etalon.

8. The single pulse laser apparatus of claim 6, wherein the pulse width of the laser beam is adjusted by selectively using one or more etalons having different properties in an intra-cavity or extra-cavity of the resonator.

9. The single pulse laser apparatus of claim 6, wherein the pulse width of the laser beam is adjusted within a range of 100 ps to 1 ns.

10. A single pulse laser apparatus including a resonator having a first mirror, a second mirror, a gain medium, a first electro-optic modulator (EOM) configured to perform Q-switching, a second EOM configured to perform single pulse switching, and an acousto-optic modulator (AOM) configured to perform mode-locking, the single pulse laser apparatus comprising:
   a photodiode configured to measure a laser beam oscillated in the resonator;
   a synchronizer configured to convert an electrical signal, which is generated by measuring the laser beam, into a transistor-transistor logic (TTL) signal;
   a delay unit configured to set a delay time for the TTL signal to synchronize the EOM and the AOM and output a trigger TTL signal according to the delay time;
   an AOM driver configured to input the trigger TTL signal to the AOM that performs mode-locking and drive the AOM;
   a first EOM driver configured to input the trigger TTL signal to the first EOM that performs Q-switching and drive the first EOM; and
   a second EOM driver configured to input the trigger TTL signal to the second EOM that performs single pulse switching and drive the second EOM,
   wherein:
   the AOM consecutively performs mode-locking;
   the first EOM preforms Q-switching by outputting energy stored due to cavity loss generated through a wavelength plate; and
   the second EOM preforms single pulse switching.

11. The single pulse laser apparatus of claim 10, further comprising a controller configured to monitor a pulse width and pulse energy of the laser beam output from the resonator and determine the delay time.

12. The single pulse laser apparatus of claim 11, wherein the controller determines a duration time during which the trigger TTL signal is maintained.

13. The single pulse laser apparatus of claim 10, further comprising a power supplier configured to supply energy to the gain medium and input a synchronizing TTL signal, which is output when a lamp is pumped, to the delay unit.

14. The single pulse laser apparatus of claim 10, further comprising an etalon configured to adjust a pulse width of the laser beam.

15. The single pulse laser apparatus of claim 14, wherein:
   the etalon is an optical device corresponding to a flat plate having parallel surfaces which have a constant reflectivity, wherein the constant reflectivity is increased by depositing a dielectric multi-layer thin film on one or both surfaces of the flat plate having the parallel surfaces made of glass or crystal; and
   the pulse width of the laser beam is adjusted by a reflectivity, a thickness, and a refractive index of the etalon by limiting a transmission wavelength band of the laser beam when the laser beam is transmitted through the etalon.

16. The single pulse laser apparatus of claim 14, wherein the pulse width of the laser beam is adjusted by selectively using one or more etalons having different properties in an intra-cavity or extra-cavity of the resonator.

17. The single pulse laser apparatus of claim 14, wherein the pulse width of the laser beam is adjusted within a range of 100 ps to 1 ns.

* * * * *